(12) United States Patent
Tong et al.

(10) Patent No.: US 11,386,694 B2
(45) Date of Patent: Jul. 12, 2022

(54) COLOR FILM SUBSTRATE, DISPLAY PANEL AND DISPLAY DEVICE

(71) Applicant: BOE Technology Group Co., Ltd., Beijing (CN)

(72) Inventors: Jie Tong, Beijing (CN); Yanqing Chen, Beijing (CN); Tingting Zhao, Beijing (CN); Yingxue Yu, Beijing (CN); Litao Fan, Beijing (CN); Dong Wang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/235,383

(22) Filed: Apr. 20, 2021

(65) Prior Publication Data

US 2022/0092285 A1 Mar. 24, 2022

(30) Foreign Application Priority Data

Sep. 23, 2020 (CN) .......................... 202011008295.9

(51) Int. Cl.
| | | |
|---|---|---|
| *G02F 1/1333* | (2006.01) | |
| *G02F 1/1335* | (2006.01) | |
| *G06V 40/13* | (2022.01) | |
| *G02F 1/13357* | (2006.01) | |

(52) U.S. Cl.
CPC ...... *G06V 40/1318* (2022.01); *G02F 1/13338* (2013.01); *G02F 1/133512* (2013.01); *G02F 1/133514* (2013.01); *G02F 1/1336* (2013.01); *G02F 2203/11* (2013.01)

(58) Field of Classification Search
CPC ............ G06V 40/1318; G02F 1/13338; G02F 1/133512; G02F 1/133514; G02F 1/1336; G02F 2203/11
See application file for complete search history.

(56) References Cited

U.S. PATENT DOCUMENTS

| | | | | |
|---|---|---|---|---|
| 9,791,471 | B2 * | 10/2017 | Qiu | ..................... G01P 15/0802 |
| 2017/0255054 | A1 * | 9/2017 | Li | ..................... G02F 1/133617 |

FOREIGN PATENT DOCUMENTS

| | | | | |
|---|---|---|---|---|
| CN | 105467660 | A * | 4/2016 | |
| CN | 106094326 | A * | 11/2016 | |
| CN | 207301559 | U * | 5/2018 | |
| CN | 109521590 | A * | 3/2019 | ........... G02F 1/1333 |
| WO | WO-2020155550 | A1 * | 8/2020 | ......... G02F 1/13338 |

* cited by examiner

*Primary Examiner* — Ricardo Osorio
(74) *Attorney, Agent, or Firm* — ArentFox Schiff LLP; Michael Fainberg

(57) ABSTRACT

The present disclosure discloses a color film substrate, a display panel and a display device. The color film substrate includes a substrate; a light shielding layer on the substrate, wherein the light shielding layer is provided with a plurality of pixel openings and is configured to block visible light and transmit infrared light so as to be multiplexed as a black matrix, and infrared light transmittance of the light shielding layer is greater than infrared light transmittance of the black matrix; and a color resist layer on a side, away from the substrate, of the light shielding layer, wherein the color resist layer includes a plurality of color resists, and each of the color resists respectively corresponds to one of the pixel openings and extends from the corresponding pixel opening to a surface, away from the substrate, of the light shielding layer.

12 Claims, 3 Drawing Sheets

COLOR FILM SUBSTRATE, DISPLAY PANEL AND DISPLAY DEVICE

CROSS REFERENCE TO RELATED APPLICATIONS

The present disclosure claims priority to Chinese Patent Application No. 202011008295.9 filed with the China National Intellectual Property Administration on Sep. 23, 2020, the entire contents of which are incorporated herein by its reference.

FIELD

The present disclosure relates to the field of display technology, and in particular to a color film substrate, a display panel and a display device.

BACKGROUND

As a biological recognition mode, fingerprint recognition plays a huge role in individual privacy protection. At present, electronic products on the market are almost provided with fingerprint recognition systems, for example, an automobile, a mobile phone, a time recorder and the like may have a fingerprint recognition function.

SUMMARY

Embodiments of the present disclosure provide a color film substrate, a display panel and a display device.

An embodiment of the present disclosure provides a color film substrate, including:

a substrate;

a light shielding layer on the substrate, wherein the light shielding layer is provided with a plurality of pixel openings and is configured to block visible light and transmit infrared light so as to be multiplexed as a black matrix, and infrared light transmittance of the light shielding layer is greater than infrared light transmittance of the black matrix; and a color resist layer on the side, away from the substrate, of the light shielding layer, wherein the color resist layer includes a plurality of color resists, and each of the color resists respectively corresponds to one of the pixel openings and extends from the corresponding pixel opening to a surface, away from the substrate, of the light shielding layer.

In some embodiments, in the above-mentioned color film substrate provided by the embodiments of the present disclosure, the light shielding layer is made of a material including an organic pigment.

In some embodiments, in the above-mentioned color film substrate provided by the embodiments of the present disclosure, infrared light transmittance of the organic pigment is increased with an increase of a wavelength.

In some embodiments, in the above-mentioned color film substrate provided by the embodiments of the present disclosure, the infrared light transmittance of the organic pigment is greater than or equal to 20%.

In some embodiments, in the above-mentioned color film substrate provided by the embodiments of the present disclosure, a thickness of the light shielding layer in a direction perpendicular to the substrate is greater than or equal to 1.8 μm and is smaller than or equal to 4 μm.

In some embodiments, in the above-mentioned color film substrate provided by the embodiments of the present disclosure, parts, on the surface of the light shielding layer away from the substrate, of two adjacent color resists of the plurality of color resists are not overlapped with each other.

In some embodiments, the above-mentioned color film substrate provided by the embodiments of the present disclosure further includes a flat layer on the side, away from the substrate, of the color resist layer, wherein a surface on the side, away from the substrate, of the flat layer is a plane.

In some embodiments, in the above-mentioned color film substrate provided by the embodiments of the present disclosure, a thickness of the flat layer is greater than or equal to 2 μm and is smaller than or equal to 5 μm.

Based on the same inventive concept, an embodiment of the present disclosure further provides a display panel, including:

an array substrate; and a color film substrate opposite to the array substrate; and a liquid crystal layer between the array substrate and the color film substrate;

wherein the color film substrate is the above-mentioned color film substrate.

In some embodiments, the display panel further includes:

a first polarizer on a side, away from the array substrate, of the color film substrate; and a second polarizer on a side, away from the color film substrate, of the array substrate;

wherein a light transmission axis of the first polarizer is perpendicular to a light transmission axis of the second polarizer.

Based on the same inventive concept, an embodiment of the present disclosure further provides a display device, including:

a backlight module;

a display panel on a light emergent side of the backlight module; wherein the display panel is the above-mentioned display panel;

an infrared light source located at an end of the display panel and a fingerprint recognition module located on a side, away from the display panel, of the backlight module;

wherein:

the backlight module is provided with a via hole in an area corresponding to the fingerprint recognition module; and after infrared light emitted by the infrared light source is reflected by fingers, the reflected infrared light is irradiated to the fingerprint recognition module through the display panel and the via hole.

In some embodiments, a projection of the fingerprint recognition module on the display panel is located in a display area of the display panel.

In some embodiments, the display device further includes a protective cover plate, wherein the display panel and the infrared light source are disposed side by side on the protective cover plate.

In some embodiments, a projection of the display panel on the protective cover does not overlapped with a projection of the infrared light source on the protective cover.

DETAILED DESCRIPTION OF THE EMBODIMENTS

In order to make objectives, technical solutions and advantages of embodiments of the present disclosure clearer, the technical solutions in the embodiments of the present disclosure will be described clearly and completely below in conjunction with accompanying drawings in the embodiments of the present disclosure. It should be noted that the sizes and shapes of the figures in the accompanying drawings do not reflect real scales, and are merely to illustrate the contents of the present disclosure. Furthermore, same or similar numerals throughout indicate same or similar elements or elements with same or similar functions. Obviously, the described embodiments are a part of the embodiments of the present disclosure, not all the embodiments.

Based on the described embodiments of the present disclosure, all other embodiments obtained by those of ordinary skill in the art without creative work shall fall within the protection scope of the present disclosure.

Unless otherwise defined, technical terms or scientific terms used herein shall be ordinary meanings as understood by those of ordinary skill in the art of the present disclosure. The words "first", "second" and similar words used in the description and claims of the present disclosure do not denote any order, quantity or importance, but are merely used to distinguish different components. The word "including" or "includes" or the like means that the element or object preceding the word covers the element or object listed after the word and its equivalent, without excluding other elements or objects. The words "inner", "outer", "upper", "lower" and the like are merely used for denoting a relative positional relationship, and after an absolute position of the described object is changed, the relative positional relationship may also be correspondingly changed.

A fingerprint recognition technology mainly includes under-screen infrared fingerprint recognition, in-screen capacitive fingerprint recognition, in-screen optical fingerprint recognition and the like, wherein an under-screen infrared fingerprint recognition product is getting more attention from many consumers due to the simple and beautiful design itself. At present, in the under-screen fingerprint recognition product based on a liquid crystal display panel (LCD), color resists with the three colors including red, green and blue are capable of allowing infrared light to transmit, while the transmittance of a black matrix (BM), made of a carbon black material, on an infrared band is very low, which greatly affects infrared fingerprint imaging.

Figure 1:
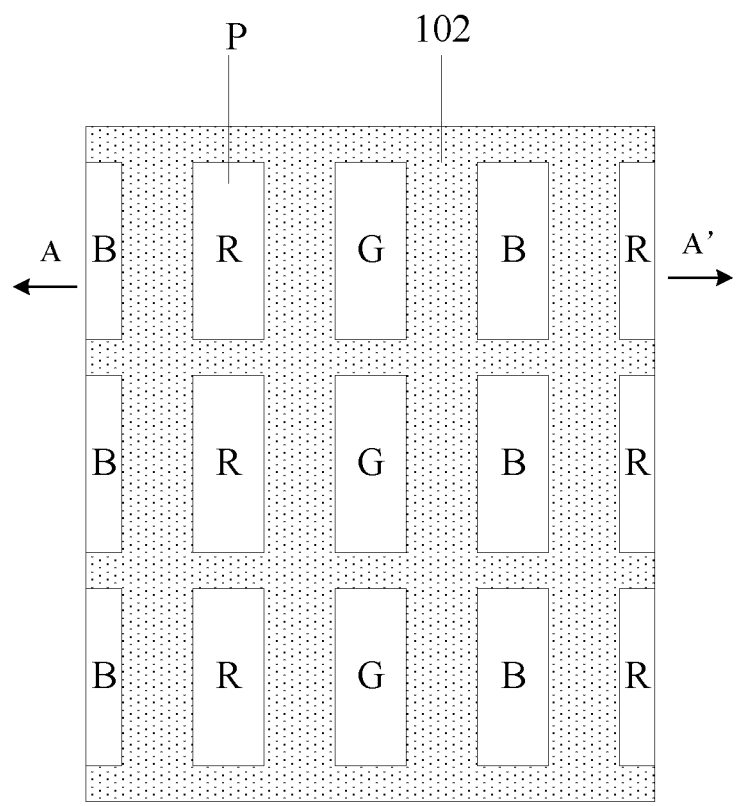
FIG. 1 is a schematic diagram showing a structure of a color film substrate provided by an embodiment of the present disclosure.
Figure 2:
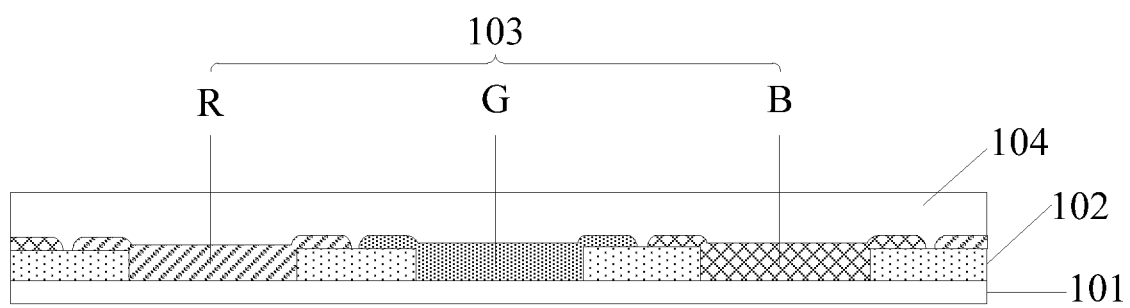
FIG. 2 is a cross-sectional diagram showing along AA' of the color film substrate of FIG. 1 provided by the embodiment of the present disclosure.

An embodiment of the present disclosure provides a color film substrate, as shown in FIG. 1 and FIG. 2, including:

a substrate 101;

a light shielding layer 102 on the substrate 101, wherein the light shielding layer 102 is provided with a plurality of pixel openings P and is configured to block visible light and transmit infrared light so as to be multiplexed as a black matrix (BM), and the infrared light transmittance of the light shielding layer 102 is greater than the infrared light transmittance of the black matrix (BM); and a color resist layer 103 on a side, away from the substrate 101, of the light shielding layer 102, wherein the color resist layer 103 includes a plurality of color resists (such as a red light color resist R, a green light color resist G and a blue light color resist B), and each of the color resists respectively corresponds to one of the pixel openings P and extends from the corresponding pixel opening P to a surface, away from the substrate 101, of the light shielding layer 102.

In the above-mentioned color film substrate provided by the embodiment of the present disclosure, through the arrangement of the light shielding layer 102 multiplexed as the black matrix (BM), color mixture between the adjacent color resists is avoided, and a normal display function is guaranteed; in addition, since the infrared light transmittance of the light shielding layer 102 is greater than the infrared light transmittance of the black matrix (BM), the intensity of the fingerprint-reflected infrared light irradiated on a fingerprint recognition module is enhanced, and thus, a fingerprint recognition effect is effectively improved.

Figure 3:
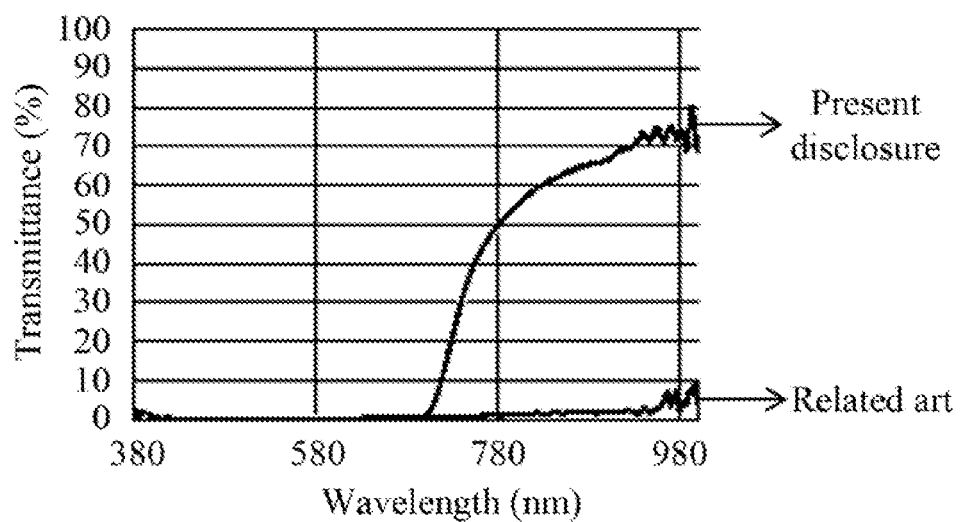
FIG. 3 is a light transmittance curve of a light shielding layer provided by an embodiment of the present disclosure and a light transmittance curve of a black matrix in the related art.

In the above-mentioned color film substrate provided by some embodiments of the present disclosure, the light shielding layer 102 is made of a material including an organic pigment, and the infrared light transmittance of the organic pigment is increased with the increase of a wavelength, as shown in FIG. 3. In addition, it may be seen from FIG. 3 that the infrared light transmittance of a black matrix (BM) in the related art is extremely low and is even negligible. In some embodiments, the infrared light (@940 nm) transmittance of the black matrix (BM) in the related art is smaller than 5%, while the infrared light (@940 nm) transmittance of the light shielding layer 102 in the present disclosure is greater than or equal to 20%. Known by comparison, compared with the black matrix (BM), the light shielding layer 102 in the present disclosure greatly increases the transmittance on an infrared band.

In the above-mentioned color film substrate provided by some embodiments of the present disclosure, in order to reach an optical density (OD) value which is the same as that of the black matrix (BM), the thickness of the light shielding layer 102 in a direction perpendicular to the substrate 101 is greater than or equal to 1.8 μm and is smaller than or equal to 4 μm, such as 1.8 μm, 2 μm, 2.5 μm, 3 μm, 3.5 μm and 4 μm.

In the above-mentioned color film substrate provided by some embodiments of the present disclosure, as shown in FIG. 2, parts, located on the surface of the light shielding layer 102 away from the substrate 101, of two adjacent color resists are not overlapped with each other. Parts, located on a surface of the black matrix (BM), of the two adjacent color resists in the related art are overlapped with each other. The light shielding layer 102 in the present disclosure is relatively thick, if the parts, located on the surface of the light shielding layer 102 away from the substrate 101, of the two adjacent color resists are still overlapped with each other, an obvious pattern edge protrusion may be formed on an overlapped position, and therefore, in order to reduce the pattern edge protrusion, the parts, located on the surface of the light shielding layer 102 away from the substrate 101, of the two adjacent color resists may be set not to be overlapped with each other.

The above-mentioned color film substrate provided by some embodiments of the present disclosure, as shown in FIG. 2, may include: a flat layer 104 located on a side, away from the substrate 101, of the color resist layer 103, wherein a surface on the side, away from the substrate 101, of the flat layer 104 is a plane, which is beneficial to the improvement on the flatness of a subsequent film layer (such as an alignment layer) on the flat layer 104.

In the above-mentioned color film substrate provided by some embodiments of the present disclosure, since the light shielding layer 102 is relatively thick, in order to ensure that the surface on the side, away from the substrate 101, of the flat layer 104 is a plane, the thickness of the flat layer 104 may be set to be greater than or equal to 2 μm and is smaller than or equal to 5 μm, such as 2 μm, 2.5 μm, 3 μm, 3.5 μm, 4 μm, 4.5 μm and 5 μm.

Figure 4:
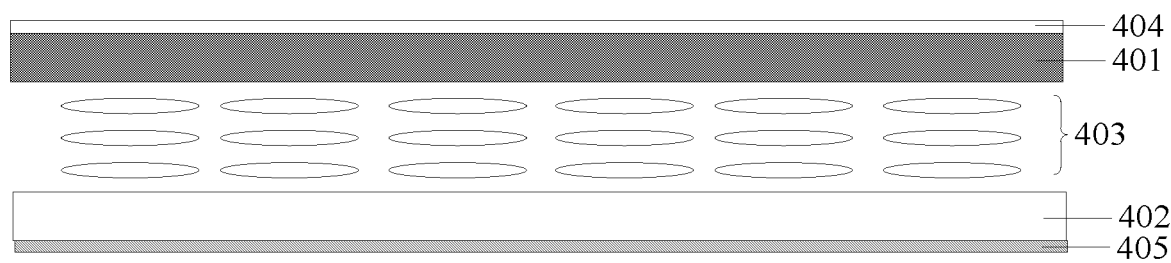
FIG. 4 is a schematic diagram showing a structure of a display panel provided by an embodiment of the present disclosure.

Based on the same inventive concept, an embodiment of the present disclosure provides a display panel, as shown in FIG. 4, including: a color film substrate 401, an array substrate 402 disposed opposite to the color film substrate 401, and a liquid crystal layer 403 located between the array substrate 402 and the color film substrate 401, wherein the color film substrate 401 is the above-mentioned color film substrate. The problem solving principle of the display panel is similar to that of the above-mentioned color film substrate, and therefore, the implementation of the display panel provided by the embodiment of the present disclosure may refer to the implementation of the above-mentioned color film substrate provided by the embodiment of the present disclosure, the descriptions thereof are omitted herein.

The above-mentioned display panel provided by some embodiments of the present disclosure, as shown in FIG. 4, generally may further include: a first polarizer 404 located on a side of the color film substrate 401 away from the array substrate 402 and a second polarizer 405 located on a side of the array substrate 402 away from the color film substrate 401, wherein a light transmission axis of the first polarizer 404 is perpendicular to a light transmission axis of the second polarizer 405.

Figure 5:
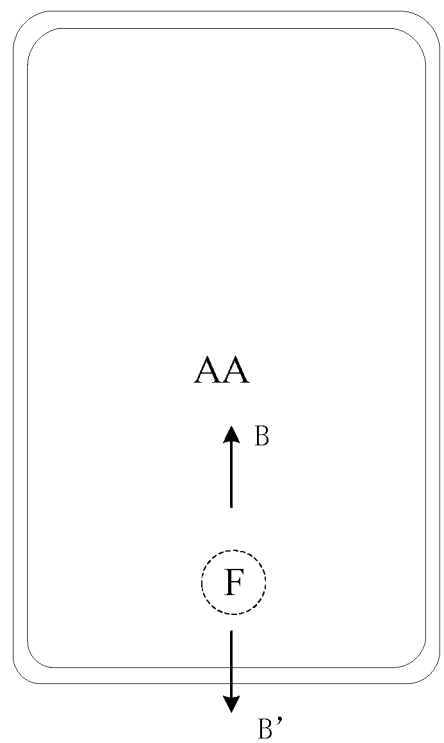
FIG. 5 is a schematic diagram showing a structure of a display device provided by an embodiment of the present disclosure.
Figure 6:
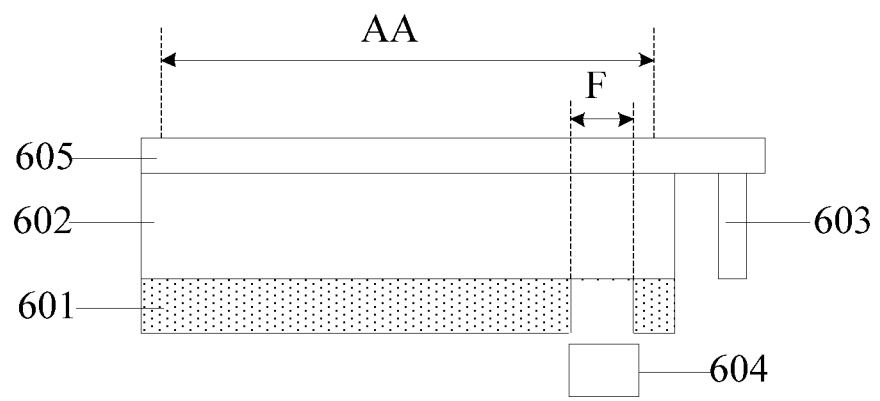
FIG. 6 is a cross-sectional diagram along BB' of the display device of FIG. 5 provided by the embodiment of the present disclosure.

Based on the same inventive concept, an embodiment of the present disclosure further provides a display device, as shown in FIG. 5 and FIG. 6, including: a backlight module 601, a display panel 602 located on a light emergent side of the backlight module 601, an infrared light source 603 located at an end of the display panel 602 and a fingerprint recognition module 604 located on the side, away from the display panel 602, of the backlight module 601, wherein the backlight module 601 is provided with a via hole in an area corresponding to the fingerprint recognition module 604; and after infrared light emitted by the infrared light source 603 is reflected by fingers in a fingerprint recognition area F, the infrared light which is reflected is irradiated to the fingerprint recognition module 604 through the display panel 602 and the via hole.

In some embodiments, a projection of the fingerprint recognition module 604 on the display panel 602 is located in a display area AA of the display panel.

In some embodiments, the fingerprint recognition module 604 may include an infrared photosensitive device, after the infrared photosensitive device receives the infrared light reflected by the fingers, an infrared light signal may be converted into an electric signal, and infrared light reflected by a fingerprint valley and infrared light reflected by a fingerprint ridge have different intensities, so that a fingerprint image may be obtained by detecting the electric signal output by the infrared photosensitive device. In addition, the fingerprint recognition area F is disposed in the display area AA, which is beneficial to the reduction of a border and the realization of a full screen design.

The above-mentioned display device provided by some embodiments of the present disclosure, as shown in FIG. 6, may further include a protective cover plate 605. In some embodiments, the display panel 602 and the infrared light source 603 may be disposed side by side on the protective cover plate 605. In some embodiments, a projection of the display panel 602 on the protective cover 605 does not overlapped with a projection of the infrared light source 603 on the protective cover 605. Optionally, the protective cover plate 605 may be made of a material, such as glass, with good light transmittance, high rigidity and high scratch resistance.

In addition, the display device may be any product or component with a display function, such as a mobile phone, a tablet computer, a television, a display, a notebook computer, a digital photo frame, a navigator, a smart watch, a fitness wristband and a personal digital assistant. Other essential components of the display device should be understood to be included by those of ordinary skill in the art so as not to be repeatedly described herein and not to be used as a limitation on the present disclosure. In addition, the problem solving principle of the display device is similar to that of the above-mentioned display panel, and therefore, the implementation of the display device may refer to the embodiment of the above-mentioned display panel, the descriptions thereof are omitted herein.

The embodiments of the present disclosure provide the above-mentioned color film substrate, display panel and display device. The color film substrate includes the substrate; the light shielding layer on the substrate, wherein the light shielding layer is provided with the plurality of pixel openings and is configured to block the visible light and transmit the infrared light so as to be multiplexed as the black matrix, and the infrared light transmittance of the light shielding layer is greater than the infrared light transmittance of the black matrix; and the color resist layer, located on the side, away from the substrate, of the light shielding layer, wherein the color resist layer includes the plurality of color resists, and each of the color resists respectively corresponds to one of the pixel openings and extends from the corresponding pixel opening to the surface of the light shielding layer away from the substrate. Through the arrangement of the light shielding layer multiplexed as the black matrix, color mixture between the adjacent color resists is avoided, and a normal display function is guaranteed; in addition, since the infrared light transmittance of the light shielding layer is greater than the infrared light transmittance of the black matrix, the intensity of the fingerprint-reflected infrared light irradiated on the fingerprint recognition module is enhanced, and thus, a fingerprint recognition effect is effectively improved.

Obviously, those skilled in the art can make various changes and variations on the present disclosure without departing from the spirits and scopes of the present disclosure. In this way, if these changes and variations of the present disclosure fall within the scope of the claims of the present disclosure and equivalent technologies of the claims, the present disclosure is also intended to include these changes and variations.

What is claimed is:

1. A display device, comprising: a backlight module; a display panel on a light emergent side of the backlight module; an infrared light source at an end of the display panel; and a fingerprint recognition module on a side, away from the display panel, of the backlight module, wherein:

the backlight module is provided with a via hole in an area corresponding to the fingerprint recognition module; and after infrared light emitted by the infrared light source is reflected by fingers, the reflected infrared light is irradiated to the fingerprint recognition module through the display panel and the via hole; A the display panel, comprising: an array substrate; a color film substrate opposite to the array substrate; and a liquid crystal layer between the array substrate and the color film substrate; the color film substrate, comprising: a substrate; a light shielding layer on the substrate, wherein the light shielding layer is provided with a plurality of pixel openings and is configured to block visible light and transmit infrared light so as to be multiplexed as a black matrix, and infrared light transmittance of the light shielding layer is greater than infrared light transmittance of the black matrix; and a color resist layer on a side, away from the substrate, of the light shielding layer, wherein the color resist layer comprises a plurality of color resists, and each of the color resists respectively corresponds to one of the pixel openings and extends from the corresponding pixel opening to a surface, away from the substrate, of the light shielding layer.

2. The color film substrate according to claim 1, wherein the light shielding layer is made of a material comprising an organic pigment.

3. The color film substrate according to claim 2, wherein infrared light transmittance of the organic pigment is increased with an increase of a wavelength.

4. The color film substrate according to claim 3, wherein the infrared light transmittance of the organic pigment is greater than or equal to 20%.

5. The color film substrate according to claim 2, wherein a thickness of the light shielding layer in a direction perpendicular to the substrate is greater than or equal to 1.8 μm and is smaller than or equal to 4 μm.

6. The color film substrate according to claim 5, wherein parts, on the surface of the light shielding layer away from the substrate, of two adjacent color resists of the plurality of color resists are not overlapped with each other.

7. The color film substrate according to claim 6, further comprising a flat layer on a side, away from the substrate, of the color resist layer, wherein a surface on the side, away from the substrate, of the flat layer is a plane.

8. The color film substrate according to claim 7, wherein a thickness of the flat layer is greater than or equal to 2 μm and is smaller than or equal to 5 μm.

9. The display panel according to claim 1, further comprising:
a first polarizer on a side, away from the array substrate, of the color film substrate; and
a second polarizer on a side, away from the color film substrate, of the array substrate;
wherein a light transmission axis of the first polarizer is perpendicular to a light transmission axis of the second polarizer.

10. The display device according to claim 1, wherein:
a projection of the fingerprint recognition module on the display panel is located in a display area of the display panel.

11. The display device according to claim 1, further comprising a protective cover plate, wherein the display panel and the infrared light source are disposed side by side on the protective cover plate.

12. The display device according to claim 11, wherein:
a projection of the display panel on the protective cover does not overlapped with a projection of the infrared light source on the protective cover.

* * * * *